Aug. 27, 1963 C. VAN DER LELY ET AL 3,101,584
IMPLEMENTS FOR LATERALLY DISPLACING CROP LYING ON THE GROUND
Filed June 3, 1959 3 Sheets-Sheet 1
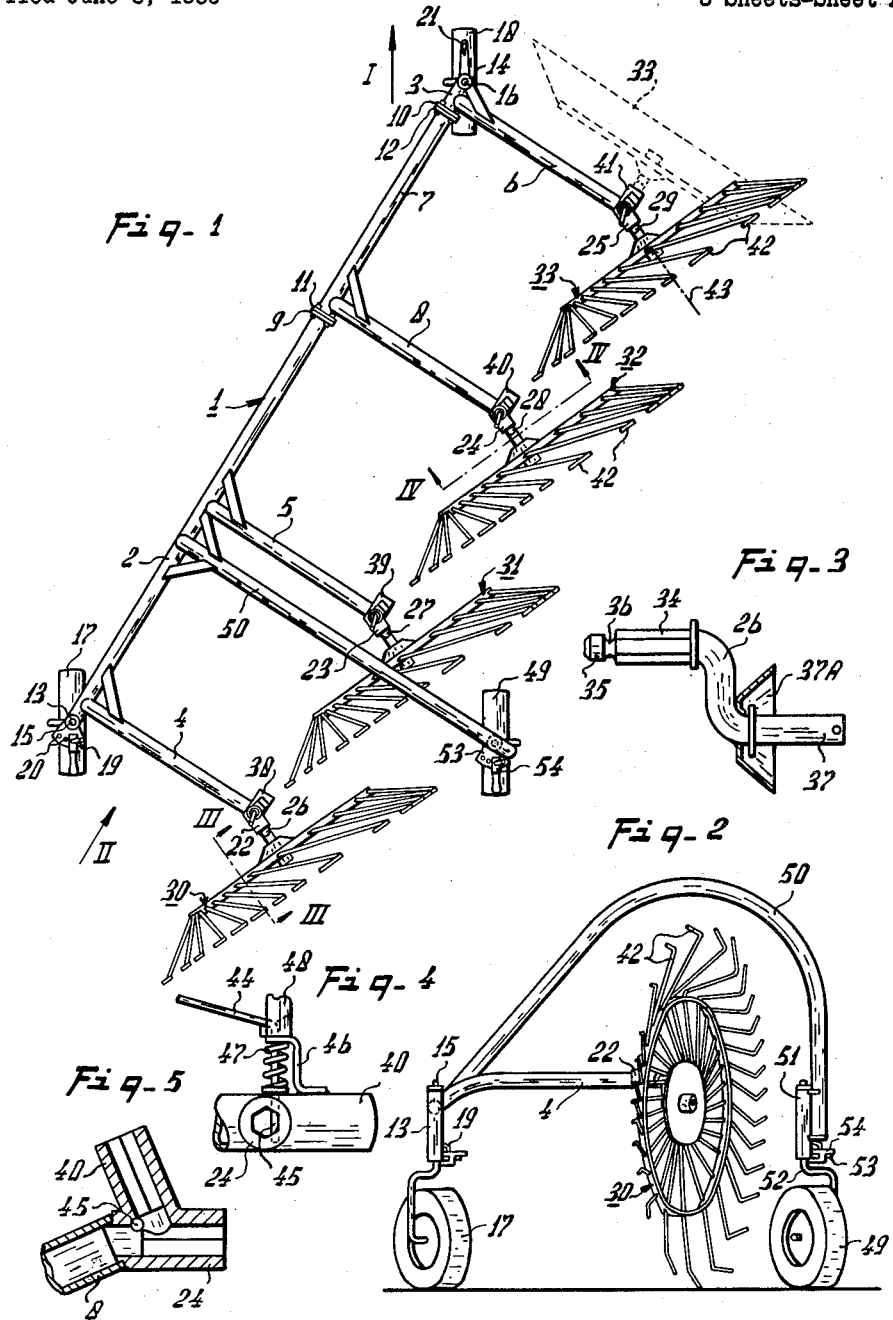

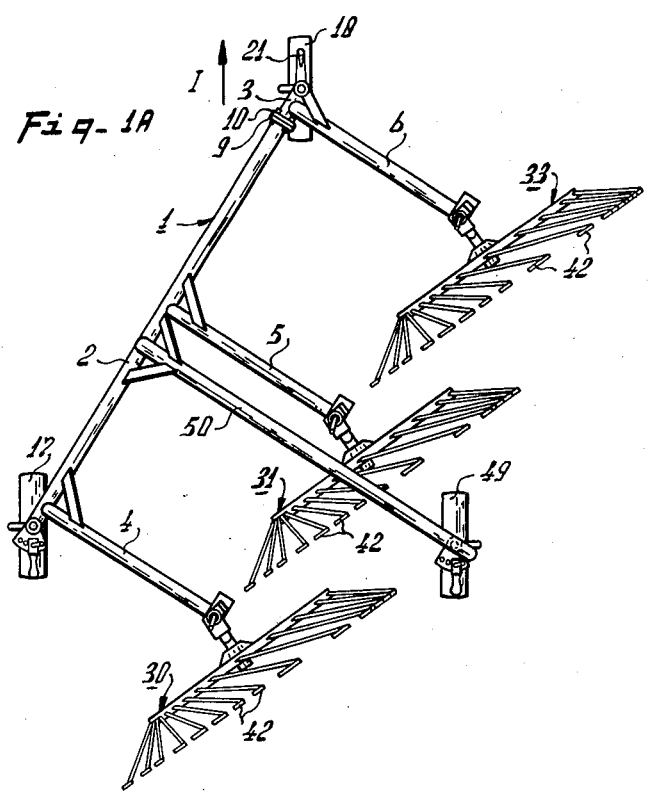

United States Patent Office 3,101,584
Patented Aug. 27, 1963

3,101,584
IMPLEMENTS FOR LATERALLY DISPLACING CROP LYING ON THE GROUND
Cornelis van der Lely and Ary van der Lely, both of Maasland, Netherlands, assignors to C. van der Lely N.V., Maasland, Netherlands, a Dutch limited-liability company of the Netherlands
Filed June 3, 1959, Ser. No. 817,803
Claims priority, application Netherlands June 20, 1958
21 Claims. (Cl. 56—377)

This invention relates to implements for laterally displacing crop lying on the ground.

In accordance with a first aspect of the invention there is provided an implement for laterally displacing crop lying on the ground, comprising a frame and a row of rake wheels, each rake wheel having an axle about which it is rotatable and each such axle being secured to the frame through the intermediary of a substantially vertical pivot so that the rake wheels can be adjusted about the axes of such pivots to occupy a first working position where they will all co-operate to perform a side-raking operation when the implement travels in a given direction, the rake wheels being adjustable about the axes of said pivots to a second working position where they will independently operate to perform a tedding operation when the implement travels in said given direction, each axle of a rake wheel being fixed as regards vertical movement in relation to the associated pivot thereof, and the arrangement being such that the side face of each rake wheel presented to the crop when carrying out a side-raking operation is opposite to that presented to the crop in tedding.

In accordance with a second aspect of the invention there is provided an implement for laterally displacing crop lying on the ground, comprising a frame and a row of rake wheels, each rake wheel having an axle about which it is rotatable, and there being means on the frame for securing each such axle thereon in either of two positions in the first of which the rake wheels occupy a first working position where they will all co-operate to perform a side-raking operation when the implement travels in a given direction, and in the second of which the rake wheels occupy a second working position where they will independently operate to perform a tedding operation when the implement travels in said given direction, the arrangement being such that the side face of each rake wheel presented to the crop when carrying out a side-raking operation is opposite to that presented to the crop in tedding.

In accordance with a third aspect of the invention there is provided an implement for laterally displacing crop lying on the ground comprising a frame supported on ground wheels and carrying a plurality of rake wheels each rotatable about an axle, the axles of the rake wheels being connected to the frame in such a way that the axle of a rake wheel may, independently of the other rake wheel axles, be fixed in any one of a number of positions of adjustment in relation to the frame, the height of the axle being varied according to the chosen position of adjustment thereof.

In accordance with a fourth aspect of the invention there is provided an implement for laterally displacing crop lying on the ground, comprising a frame beam and a row of rake wheels fastened thereto, the frame being located at the front side of the row of rake wheels in relation to the intended direction of travel of the implement, the frame beam having a supporting ground wheel located on one side of said row and near the rear end of said frame beam in relation to the intended direction of travel of the implement, said frame beam being supported by a second ground wheel disposed on the other side of said row, the rotational axes of said ground wheels being aligned, or nearly so, when the implement is in use.

In accordance with a fifth aspect of the invention there is provided an implement for laterally displacing crop lying on the ground, comprising a frame supported on ground wheels and carrying a row of rake wheels, the portion of the frame which, as seen from above, lies between two ground wheels, being such that an auxiliary frame portion may be inserted therein such auxiliary portion carrying a further rake wheel, whereby the length of the row of rake wheels may be increased.

For a better understanding of the invention and to show how the same may be carried into effect, reference will now be made, by way of example, to the accompanying drawings, in which:

FIGURE 1 is a plan view of a first embodiment of the invention,

FIGURE 1A is a plan view of the first embodiment in a modified form,

FIGURE 2 is an end view as seen in the direction of the arrow II in FIGURE 1,

FIGURE 3 is a detail of FIGURE 1 as seen from the line III—III of FIGURE 1,

FIGURE 4 is an enlarged view of a detail taken on the line IV—IV of FIGURE 1.

FIGURE 5 is a sectional plan view of the detail shown in FIGURE 4,

Figure 6:
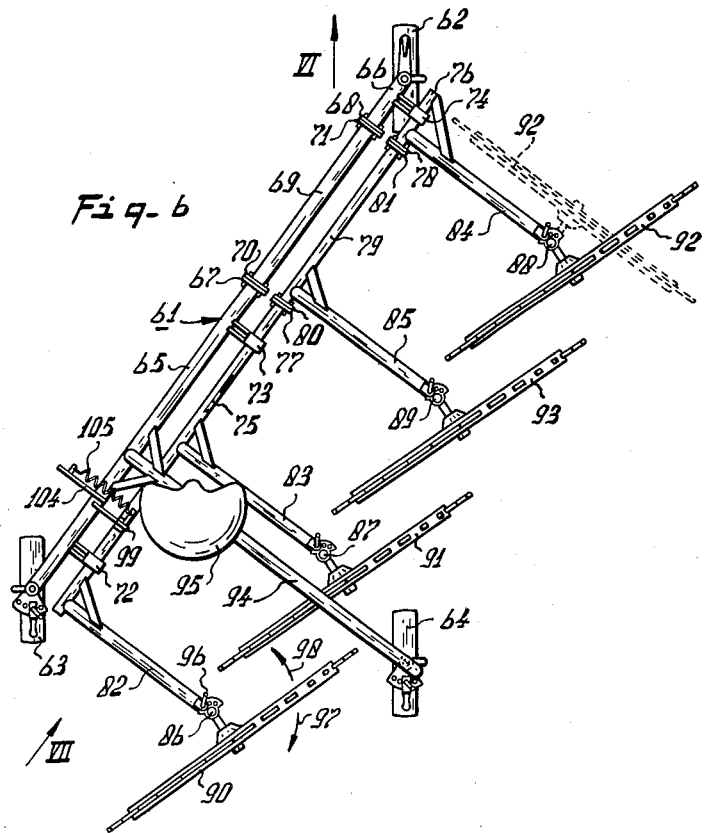
FIGURE 6 is a plan view of a second embodiment of an implement according to the invention.

In the drawing, the implement is shown as including a frame 1 consisting of a main frame beam and an auxiliary frame beam. The main frame beam includes two portions 2 and 3 to which an intermediary auxiliary frame beam 7 is connected. The two portions of the main frame beam and the auxiliary frame beam all being linearly aligned alternately, the auxiliary frame beam may be omitted and the portions 2, 3 connected directly together as shown in FIG. 1A. In other respects the implement in FIG. 1A is identical to that in FIG. 1. The portion 2 carries two supporting arms 4 and 5, while the portion 3 carries a single supporting arm 6. The auxiliary beam 7 has likewise a single supporting arm 8. The auxiliary frame beam 7 is held in place by interconnected flanges 9, 10, 11 and 12, the flanges 11 and 12 being formed upon the beam 7 and the flanges 9 and 10 upon the portions 2 and 3 respectively. The free ends of the frame beam portions 2 and 3 having bearings 13 and 14 respectively mounted thereon for vertical shafts 15 and 16. Beneath its bearing 13, the shaft 15 extends downwardly and is shaped so as to form the horizontal axle A for a ground wheel 17. The shaft 16 is similar and is associated with a ground wheel 18. The bearing 13 has fixedly secured thereto a sector plate P formed with a series of holes 20. The shaft 13 has a handle H secured thereto which may be locked to the sector plate in a number of adjusted positions with the aid of a pin 19 which can be inserted into any one of the holes 20. Hence the setting of the ground wheel 17 about the vertical axis of the bearing 13 can be adjustably fixed. The shaft 16 associated with the ground wheel 18 has a towing hook 21 connected therewith.

Bearings 22, 23, 24 and 25 are carried at the ends of the supporting arms 4, 5, 8 and 6. Cranks 26, 27, 28 and 29 can be inserted in these bearings, the cranks carrying rake wheels 30, 31, 32 and 33. Each of the cranks 26, 27, 28 and 29 is the same and the crank 26 is shown in FIGURE 3. From this figure it will be seen that the crank axel 34 is of hexagonal section and is formed with a circular section head 35 and neck 36. The crank has a crank pin or shaft 37 intended to form the axle on which the rake wheel 30 (diagrammatically shown) is mounted for rotation. A hood 37A is mounted on the crank pin so as to prevent crop from entering between the external surface of the crank pin and the bearing surface of the rake wheel 30 thereon.

In the sectional detail shown in FIGURE 4, the rake wheel 32 together with its crank 28 have been removed to show the hexagonal section hole into which the crank axle 34 will fit. It will be appreciated that when a hexagonal crank axle has been entered in one of the bearings 22, 23, 24 and 25, the associated rake wheel will not be able to swing about the axis of such crank axle. When all the rake wheels are mounted in the illustrated position in FIGURE 1 and when the implement is towed in the direction of travel indicated by the arrow I, the implement will operate as a side-delivery rake delivering crop to the left.

The implement can be brought to a second working position since each of the supports 4, 5, 8 and 6 have further bearings 38, 39, 40 and 41, which constitute alternative second supporting means for the rake wheels. Each of the bearings 38, 39, 40 and 41 also has a hexagonal hole for the hexagonally sectioned crank axles. When the cranks are disposed in the bearings 38, 39, 40, 41 and the implement is then in its second working position, the rake wheels have a setting such as is shown for the rake wheel 33 in dotted lines in FIGURE 1. In the second working position the implement is also intended to be towed in the direction shown by the arrow I, and the implement then acts as a tedder, each wheel delivering crop to the right independently of the others. It will be appreciated that in both the working position as a side-delivery rake and that as a tedder, the rake wheels turn by virtue of the engagement of their tines 42 with the ground. In order to insure satisfactory shedding, the tines 42 are directed backwardly with reference to the direction of rotation of the rake wheels so that on the rising side of a rake wheel the tip of a tine lags the root thereof. In the full line position shown in FIGURE 1 where the implement acts as a side-delivery rake, the rising side of each rake wheel is the left-hand side thereof as seen in plan. When the rake wheels are in the dotted line position and the implement acts as a tedder, it will be realized that the other, concave, side face of the rake wheel is presented to the crop as compared with the full line position where the convex side face is presented. The rising side of a rake wheel is now the right-hand side thereof as seen in plan and the tines will still have the desired orientation on such rising side to insure shedding of the crop.

When the rake wheels are in the position appropriate for tedding, it will be noted that the planes of the rake wheels will lie substantially perpendicular to the axis of the composite frame beam 2, 3 and 7. It is therefore important to insure that the supporting arms 4, 5, 6 and 8 are somewhat longer than the radius of the rake wheels.

It will be appreciated that in either working position, once the cranks of the rake wheels have been inserted in the hexagonal holes in the bearings, the rake wheels are fixed as regards their vertical position in relation to the supporting arms carrying the bearings. Thus the pressure of the rake wheels on the ground is also fixed. It will, however, be appreciated that the cranks of the rake wheels can be inserted in various positions in the hexagonal holes of their bearings. By choice of appropriate positions the vertical settings of the rake wheels may be effectively adjusted whereby the pressure of the rake wheels on the ground may also be effectively adjusted.

The crank of a rake wheel has its crank axle 34 locked in a bearing with the aid of a single locking pin 44, the latter being seen best in FIGURE 4. As appears from FIGURE 5, each pair of adjacent bearings is such that the hexagonal bores of the bearings open one into the other, the axes of the bores being inclined to one another at an angle somewhat greater than 90°. A hole 45 is situated so as to extend in both bores of a pair of bearings, the hole 45 accommodating one end of the locking pin 44. The latter is supported for vertical movement in a bracket 46, there being a spring 47 which engages a collar C and urges the locking pin downwardly into the hole 45. The bracket 46 carries a face cam 48 adapted to co-operate with a laterally bent portion of the locking pin 44. By turning the locking pin 44 the bent portion thereof can be caused to ride up the face cam 48 so that the pin is raised against the action of the spring 47 to a position where the pin no longer lies in either of the bores of the associated pair of bearings. When the locking pin 44 is in its raised position, the crank axle 34 of a crank may be inserted into either of the bores of an associated pair of bearings. When the axle is fully inserted the locking pin 44 may be lowered by rotating it so that it will ride down the face cam whereupon the pin will enter the neck 36 of the crank axle so that the latter will be retained in the bearing since the head 35 will not be able to pass the locking pin 44.

The employment of but a single locking pin 44 for each pair of bearings insures that the implement may be brought from one working position to the other rapidly and easily. Each pair of associated bearings may be made from a single piece of material.

Two ground wheels 17 and 18 have been previously mentioned and it will now be noted that there is a third ground wheel 49 which is located on the opposite side of the row of rake wheels with regard to the ground wheels 17 and 18. The ground wheel 49 is connected to the frame with the aid of an elongated supporting arm 50 which is arched over the rake wheel 31. As shown in FIGURE 2, the free end of the supporting arm 50 carries a bearing 51 in which a shaft 52 is journalled. The lower end of the shaft 52 is bent to form the horizontal axle A1 for rotation of the ground wheel 49. The bearing 51 carries a sector plate 53 formed with a series of holes, and the shaft 52 carries a handle 54 which may be fixed in relation to the sector plate by inserting a locking pin through the handle and one of the holes in the sector plate. The handle and sector plate allow the setting of the ground wheel 49 to be adjustably fixed in the same way as the ground wheel 17.

The implement as shown in FIGURE 1 employs four rake wheels. The rake wheel 32 can be removed by disconnecting the auxiliary beam 7 and directly connecting together the two main frame portions 2 and 3. It will be appreciated that when the auxiliary frame beam 7 has been removed together with the associated rake wheel 32 the working width of the implement will be materially reduced. This reduction may be desirable in working certain fields. It will be observed that the auxiliary frame beam 7 when in use lies between the ground wheels 17 and 18 so that the inclusion of the auxiliary frame beam will not impair the stability of the implement.

Figure 7:
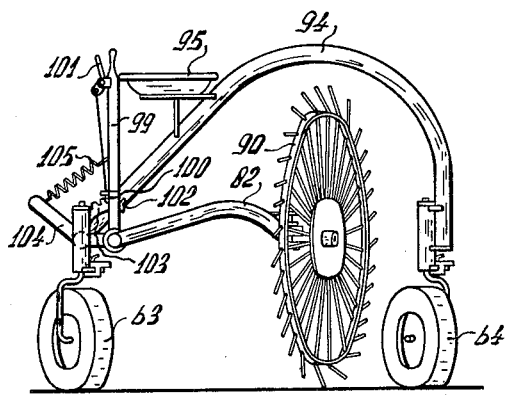
FIGURE 7 is an end view of the implement shown in FIGURE 6, as seen in the direction of the arrow VII.

Referring now to the embodiment shown in FIGURES 6 and 7, it will be seen that the implement comprises a frame 61 supported on three ground wheels 62, 63 and 64. The frame 61 comprises main frame beam portions 65 and 66 between which is connected an auxiliary frame beam portion 69. These portions are interconnected with the aid of flanges 67, 70 and 71, 68. It will be understood that if the auxiliary beam 69 is omitted the flanges 67 and 68 can be directly coupled in a manner similar to that shown in FIG. 1A. The main frame beam portion 65 carries two aligned bearings 72 and 73. A third bearing 74 is carried by the portion 66, the bearing 74 being aligned also with the other bearings. A portion 75 of a supporting beam is journalled in the bearings 72 and 73, there being a further portion 76 of such beam journalled in the bearing 74. The portions 75 and 76 are coupled by flanges 77, 80 and 81, 78, through the intermediary of an auxiliary supporting beam 79. The portion 75 carries supporting arms 82 and 83 and the portion 76 a supporting arm 84. The auxiliary supporting beam 79 carries a supporting arm 85. The supporting arms 82, 83, 84 and 85 carry vertical pivot pins 86, 87, 88 and 89 on which the axles of rake wheels 90, 91, 92 and 93 are mounted. Each of the supporting arms carries a locking device which is best seen for the arm 82 in FIGURE 7. The locking device comprises a pair of superposed lugs provided on the supporting arm and having aligned holes through which a locking pin 96 passes. A spring is arranged around the pin tending to urge the pin downwardly. The lower end of the pin may enter any one of several holes formed on an arcuate strip attached fixedly to the pivot pin 86. It will be understood that by withdrawing the locking pin 96 upwardly against the action of its spring, the rake wheel 90 may be turned about the axis of the pivot pin 96 either in the direction indicated by the arrow 97 or the direction indicated by the arrow 98. The arrangement is the same for the other rake wheels 91, 92, and 93.

The ground wheels 63 and 64 can be set with the aid of their associated locking devices in the positions shown in FIGURE 6, and the implement can be towed in the direction indicated by the arrow VI with the aid of the towing hook associated with the ground wheel 62, just as in the previously described embodiment. With the rake wheels in the settings indicated in full lines in FIGURE 6, they will rotate by virtue of their contact with the ground and will deliver crop one to the other so that the implement then acts as a side-delivery rake. It will be noted that the rake wheels 90, 91, 92 and 93 are all located on the same side of the frame beams and associated supporting arms, the ground wheels 62 and 63 and the various portions of the frame being located on the front side of the row of rake wheels whilst the ground wheel 64 is located behind the row. The implement can be brought to a second working position where it acts as a tedder by causing each of the rake wheels to assume the position shown in dotted lines for the rake wheel 92 in FIGURE 6. It will be clear that the new setting for the rake wheels cannot be achieved by first moving the rake wheel 92 with its pivot 88 after releasing its locking device 96, since the rake wheel 92 would foul the rake wheel 93. In practice it is necessary first to release the locking device 96 of the rake wheel 90 and to turn this rake wheel in the direction indicated by the arrow 97. The same is then done for the rake wheels 91 and 93 whereupon the rake wheel 92 can be brought to the position shown in dotted lines. Next the setting of the rake wheel 93 is effected and so on until the rake wheel 90 is reached. It will therefore be appreciated that each of the rake wheels must be turnable about a vertical axis to an extent of about 145°, each rake wheel being turnable in either direction away from its setting shown in full lines in FIGURE 6.

When all the rake wheels have been brought to the new setting, i.e. to that indicated in dotted lines for the rake wheel 92, the implement may be towed still in the same direction of travel VI and it will now operate as a tedder, each rake wheel independently delivering crop to the right. As in the previously described construction, it will be noted that, in the setting of the rake wheels for side-raking, the side face of the rake wheels presented to the crop is opposite to that presented to the crop in the setting for tedding.

The elongated arched supporting arm 94 may have a seat 95 mounted thereon for use by the driver when animal draught is used for the implement. Near the seat 95, a hand lever 99 is secured at one end upon the supporting beam portion 75. The hand lever 99 has a grip control 101 with which a detent 100 can be raised or lowered so that it is engaged in or withdrawn from the teeth 102 of an arcuate rack 103 fixed to the main frame portion 65. By moving the hand lever 99 in an anticlockwise direction as seen in FIGURE 7, the composite supporting beam 75, 79 and 76 is turned in its bearings so that the supporting arms are swung upwardly to bring the rake wheels thereof to a raised position suitable for the transport of the implement. With the aid of the detent 100 the rake wheels may be held in the raised transport position. To counterbalance the weight of the rake wheels and the associated supporting arms, a tension spring 105 is arranged to act between the lever 99 and a finger 104 fixed to the main frame beam portion 65. The spring 105 assists in raising the rake wheels to their transport position.

The lever 99 may serve not only for raising the rake wheels from a working position to a transport position, but also for adjusting the pressure of the rake wheels on the ground when they are in the working position. It will be understood that by selecting one or the other places on the rack for engagement with the detent the weight of the rake wheels and associated parts can be to a greater or lesser extent carried by the frame of the implement.

Although in the constructions described above the implement has supporting ground wheels, it will be appreciated that if so desired the implement could alternatively be arranged for fastening to the lifting device of a tractor so that one or more of the supporting wheels could be dispensed with.

What we claim is:
1. An implement adapted for movement in a direction of travel for laterally displacing crop lying on the ground, the implement comprising: a frame beam, a row of rake wheels fastened to said frame beam rearwardly thereof, the frame beam having opposite ends, a supporting ground wheel coupled to said frame beam at one of said ends and forwardly of the row of rake wheels, a second ground wheel coupled to said frame beam for supporting the same and positioned rearwardly of the row of rake wheels, said ground wheels being supported from said rake beam for rotation about substantially aligned axes, and means coupled to at least one of the ground wheels for fixedly adjusting the position thereof relative to the corresponding axis.

2. An implement as claimed in claim 1 wherein said frame beam is inclined relative to the direction of travel, said supporting ground wheel being coupled to the rearwardly positioned end of said frame beam.

3. An implement as claimed in claim 2 comprising a further ground wheel on the frame beam at the other of said ends, the latter end being forwardly of the first said end.

4. An implement as claimed in claim 3 comprising an auxiliary frame portion coupled to said frame beam intermediate the ends thereof to extend the distance between the wheels, and a further rake wheel coupled to the auxiliary frame portion and extending rearwardly thereof to assume a position in alignment with said row of rake wheels to extend the row of rake wheels in accordance with the extension of the distance between the wheels.

5. An implement as claimed in claim 1 wherein each of the rake wheels has a concave and a convex side face, and means for adjusting the position of said rake wheels relative to the direction of travel to permit said implement to provide side raking and tedding operations, the concave side face being presented to the crop with the rake wheels positioned such that the implement provides a tedding function.

6. An implement as claimed in claim 5 comprising means rotatably connecting said rake wheels to said frame beam, said rake wheels each being adapted for rotating about substantially aligned axes with the rake wheels in position for providing a tedding function.

7. An implement as claimed in claim 1 wherein the frame beam comprises a beam and a supporting beam turnably connected to said beam, said rake wheels being coupled to said supporting beam whereby turning of the supporting beam causes the rake wheels to be lifted from the ground.

8. An implement as claimed in claim 7 wherein said suppporting beam is constituted by first and second portions, the implement comprising an auxiliary supporting beam connected to said first and second portions and in substantial alignment therewith, and a further rake wheel coupled to said auxiliary supporting beam and extending rearwardly thereof to assume a position in alignment with said row of rake wheels.

9. An implement for laterally displacing crop lying on the ground comprising a frame, ground wheels on and supporting said frame, a plurality of rake wheels, an axle rotatably supporting each of the rake wheels from the frame, said axles being connected to the frame such that each axle, independently of the other rake wheel axles, can be fixed in a plurality of positions of adjustment in relation to the frame, the height of said axle being varied according to the position of adjustment thereof.

10. An implement as claimed in claim 9 wherein said axle is a crank pin of a crank, comprising a bearing on the frame to receive each crank and prevent rotation thereof, said bearing being capable of receiving said crank in various positions of angular adjustment.

11. An implement as claimed in claim 10 comprising a pin passing through the bearing and engaging the crank.

12. An implement as claimed in claim 10 wherein each crank includes an axle of hexagonal cross-section, the associated bearing being of similar shape.

13. An implement adapted for movement in a direction of travel for the lateral displacement of crop, the implement comprising a frame beam, running wheels on and supporting said frame beam, a row of rake wheels extending substantially parallel to said frame beam, supports extending perpendicular to said frame beam, each being connected to a rake wheel, means adjustably attaching said rake wheels to said supports for moving the rake wheels between a first position in which the implement is adapted for side raking operation and a second position in which the implement is adapted for a tedding operation, said supports during operation of the implement being in a fixed position with respect to said frame beam, a rod extending substantially parallel and immediately adjacent said frame beam and turnably supported with respect thereto, said supports being coupled to said rod and adjusting means coupled to said rod for turnably adjusting the same relative to said frame beam to cause lifting of said rake wheels.

14. An implement as claimed in claim 13 wherein said rake wheels in both working positions lie rearwardly of said frame beam.

15. An implement as claimed in claim 13 wherein the adjusting means comprises a handle for turning said rod and means for locking said handle and the rake wheels in a desired position.

16. An implement as claimed in claim 15 wherein the adjusting means includes an auxiliary spring.

17. An implement as claimed in claim 15 wherein the adjusting means is positioned at the rear of the implement.

18. An implement as claimed in claim 17 wherein the adjusting means is on said rod between the supports of the most rearwardly two rake wheels.

19. An implement as claimed in claim 13 wherein said frame beam has opposite ends, the implement further comprising a ground wheel at the ends of said frame beam.

20. An implement as claimed in claim 19 comprising a third ground wheel, an arm arched over the row of rake wheels and coupling said ground wheel to said frame beam.

21. An implement as claimed in claim 20 wherein said arm extends over said rod.

References Cited in the file of this patent

UNITED STATES PATENTS

| | | |
|---|---|---|
| 2,447,354 | Morrill | Aug. 17, 1948 |
| 2,827,754 | Hill | Mar. 25, 1958 |

FOREIGN PATENTS

| | | |
|---|---|---|
| 725,708 | Great Britain | Mar. 9, 1955 |
| 732,304 | Great Britain | June 22, 1955 |
| 1,108,945 | France | Sept. 14, 1955 |
| 1,136,309 | France | Dec. 29, 1956 |